(12) United States Patent
Wang et al.

(10) Patent No.: US 9,727,972 B2
(45) Date of Patent: Aug. 8, 2017

(54) METHOD AND TERMINAL FOR GENERATING THUMBNAIL OF IMAGE

(71) Applicant: Xiaomi Inc., Beijing (CN)

(72) Inventors: Lin Wang, Beijing (CN); Qishen Zhang, Beijing (CN); Bo Zhang, Beijing (CN)

(73) Assignee: Xiaomi Inc., Beijing (CN)

( * ) Notice: Subject to any disclaimer, the term of this patent is extended or adjusted under 35 U.S.C. 154(b) by 215 days.

(21) Appl. No.: 14/479,531

(22) Filed: Sep. 8, 2014

(65) Prior Publication Data

US 2015/0187084 A1 Jul. 2, 2015

Related U.S. Application Data

(63) Continuation of application No. PCT/CN2014/077610, filed on May 15, 2014.

(30) Foreign Application Priority Data

Dec. 30, 2013 (CN) .......................... 2013 1 0743545

(51) Int. Cl.
G06T 7/00 (2017.01)
G06T 7/40 (2017.01)
G06T 7/12 (2017.01)

(52) U.S. Cl.
CPC .............. *G06T 7/0083* (2013.01); *G06T 7/12* (2017.01); *G06T 2207/20132* (2013.01); *G06T 2210/12* (2013.01); *G06T 2210/22* (2013.01)

(58) Field of Classification Search
None
See application file for complete search history.

(56) References Cited

U.S. PATENT DOCUMENTS

| 8,213,741 | B2 | 7/2012 | Sundareson et al. |
| 8,374,457 | B1 * | 2/2013 | Wang ...................... G06T 5/002 382/260 |
| 2010/0158409 | A1 | 6/2010 | Sundareson et al. |

(Continued)

FOREIGN PATENT DOCUMENTS

| CN | 1929544 A | 3/2007 |
| CN | 101330631 A | 12/2008 |

(Continued)

OTHER PUBLICATIONS

International Search Report of PCT/CN2014/077610, from the State Intellectual Property Office of China, mailed Nov. 9, 2014.

(Continued)

*Primary Examiner* — Tize Ma
(74) *Attorney, Agent, or Firm* — Finnegan, Henderson, Farabow, Garrett & Dunner LLP

(57) ABSTRACT

A method for generating a thumbnail of an image, includes: filtering an image to obtain an edge intensity value for each pixel point in the image; sliding a preset rectangular box on the image to perform a search and, at each searched position, calculating a distribution value of information amount in the rectangular box according to the edge intensity values of the pixel points therein; and selecting the rectangular box with the largest distribution value of information amount, and intercepting content of the image corresponding to the selected rectangular box to obtain a thumbnail of the image.

9 Claims, 9 Drawing Sheets

(56) References Cited

U.S. PATENT DOCUMENTS

| | | | | |
|---|---|---|---|---|
| 2011/0087998 A1* | 4/2011 | Samadani | ............. | G06T 3/0012 715/838 |
| 2013/0120438 A1* | 5/2013 | Shechtman | .......... | H04N 1/3875 345/611 |
| 2014/0327697 A1* | 11/2014 | Yaegashi | ................... | G06T 3/00 345/625 |

FOREIGN PATENT DOCUMENTS

| | | | |
|---|---|---|---|
| CN | 102547257 | A | 12/2008 |
| CN | 102113306 | A | 6/2011 |
| CN | 102520865 | A | 6/2012 |
| CN | 103714161 | A | 4/2014 |
| EP | 2779618 | A1 | 9/2014 |
| JP | 2010193154 | A | 9/2000 |
| JP | 2004295776 | A | 10/2004 |
| JP | 2007-207055 | A | 8/2007 |
| JP | 2013102396 | A | 5/2013 |
| JP | 2013-168902 | | 8/2013 |
| RU | 2400815 | C2 | 9/2010 |
| TW | 201308248 | A | 2/2013 |
| WO | WO 2013/069314 | A1 | 5/2013 |

OTHER PUBLICATIONS

Arai, K., et al.; "Visual-Attention-Based Thumbnail Using Two-Stage GrabCut"; International Conference on Multimedia Computing and Systems (ICMCS), May 12, 2012.

European Search Report for Application No. 14200009.0-1903 mailed May 27, 2015, from the European Patent Office.

Daniel Vaquero et al., *A Survey of Image Retargeting Techniques*, Proceedings of SPIE, SPIE—International Society for Optical Engineering, US, vol. 7798 at 779814-1-15 (2010).

Bongwon Suh et al. *Automatic Thumbnail Cropping and its Effectiveness*, Proceedings of the 16th Annual ACM Symposium on User Interface Software and Technology, ACM Press, vol. 5, No. 2 at 95-104 (2003).

Masayuki Kimura et al., *A Method for Extracting Region of Interest Based on Attractiveness*, Video Information Television Engineers Technical Report, Japan, vol. 30, No. 9, pp. 35-39, Jan. 27, 2006.

Qiong Yan et al, *Hierarchical Saliency Detection*, IEEE Conference on CVPR, Jun. 2013, pp. 1155-1162, available at http://www.cse.cuhk.edu.hk/leojia/projects/hsaliency/.

English Translation of International PCT Search Report for Application No. PCT/CN2014/077610 mailed Sep. 11, 2014, from the State Intellectual Property Office of China.

* cited by examiner

320

Image (1)

Image (2)

Image (3)

Image (4)

METHOD AND TERMINAL FOR GENERATING THUMBNAIL OF IMAGE

CROSS-REFERENCE TO RELATED APPLICATIONS

This application is a Continuation of International Application No. PCT/CN2014/077610, filed May 15, 2014, which claims priority to Chinese Patent Application No. CN 201310743545.7, filed Dec. 30, 2013, the entire contents of all of which are incorporated herein by reference.

TECHNICAL FIELD

The present disclosure generally relates to the field of image processing and, more particularly, to a method and a terminal for generating a thumbnail of an image.

BACKGROUND

With the development of cameras in mobile devices, the capacity of a personal album in a mobile device is rapidly growing. Typically, a thumbnail will be generated for a stored image in the personal album, and be put in a preview mode for a user to preview and review. A conventional method for generating a thumbnail of an image is directly intercepting a middle part of the image, and scaling the intercepted middle part to obtain the thumbnail of the image.

However, the conventional method takes spatial position information of the image into account, and does not consider content information of the image, which may cause the generated thumbnail not to express the content information about the original image. For example, when a position of a figure is not in a middle part of an image, if only the middle part of the image is intercepted, the generated thumbnail may only include a part of the figure, which reduces accuracy of expressing the content information of the original image.

SUMMARY

According to a first aspect of the present disclosure, there is provided a method for generating a thumbnail of an image, comprising: filtering an image to obtain an edge intensity value for each pixel point in the image; sliding a preset rectangular box on the image to perform a search and, at each searched position, calculating a distribution value of information amount in the rectangular box according to the edge intensity values of the pixel points therein; and selecting the rectangular box with the largest distribution value of information amount, and intercepting content of the image corresponding to the selected rectangular box to obtain a thumbnail of the image.

According to a second aspect of the present disclosure, there is provided a terminal, comprising: a processor; and a storage for storing instructions executable by the processor; wherein the processor is configured to: filter an image to obtain an edge intensity value for each pixel point in the image; slide a preset rectangular box on the image to perform a search and, for the rectangular box at each searched position, calculate a distribution value of information amount in the rectangular box according to the edge intensity values of the pixel points therein; and select the rectangular box with the largest distribution value of information amount, and intercept content of the image corresponding to the selected rectangular box to obtain a thumbnail of the image.

According to a third aspect of the present disclosure, there is provided a non-transitory storage medium having stored therein instructions that, when executed by a processor of a terminal, cause the terminal to perform a method for generating a thumbnail of an image, the method comprising: filtering an image to obtain an edge intensity value for each pixel point in the image; sliding a preset rectangular box on the image to perform a search and, for the rectangular box at each searched position, calculating a distribution value of information amount in the rectangular box according to the edge intensity values of the pixel points therein; and selecting the rectangular box with the largest distribution value of information amount, and intercepting content of the image corresponding to the selected rectangular box to obtain a thumbnail of the image.

It should be understood that both the above general description and the following detailed description are only illustrative and explanatory, which do not limit the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
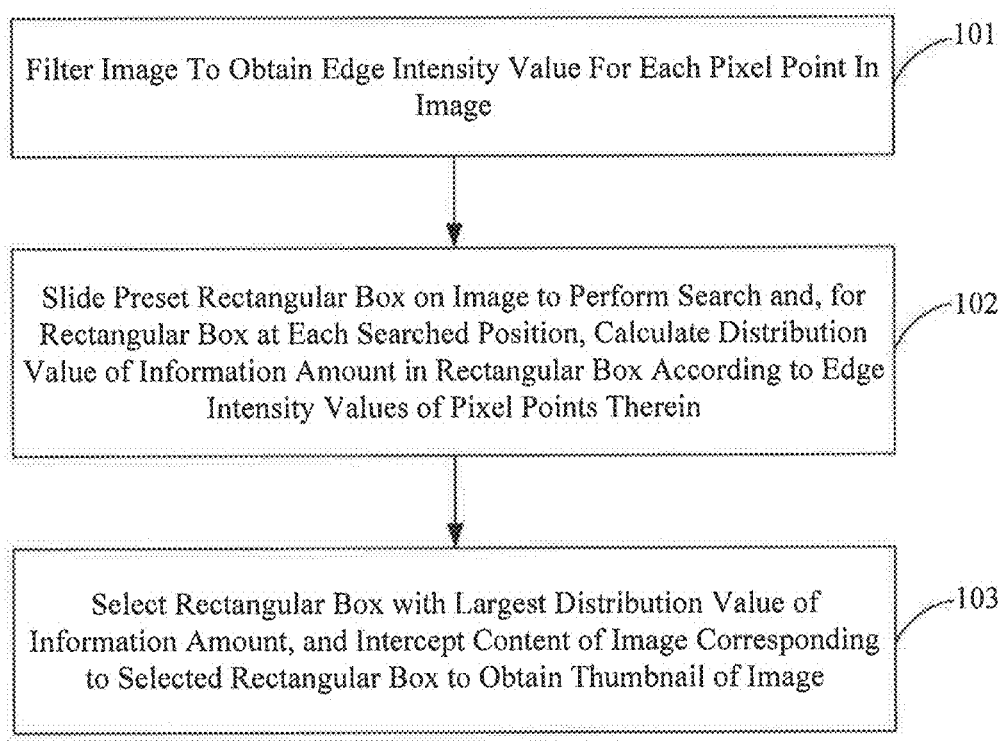
FIG. 1 is a flowchart of a method for generating a thumbnail of an image, according to an exemplary embodiment.

FIG. 1 is a flowchart of a method 100 for generating a thumbnail of an image, according to an exemplary embodiment. Referring to FIG. 1 the method 100 includes the following steps.

In step 101, the image is filtered to obtain an edge intensity value for each pixel point in the image.

In one exemplary embodiment, filtering the image to obtain the edge intensity value for each pixel point in the image may include filtering the image through at least one of a Laplace edge filtering operator, a Sobel edge filter operator, a Robert edge operator, a Prewitt edge operator, or a LOG edge operator, to obtain the edge intensity value for each pixel point in the image.

In the illustrated embodiment, pixel points with relatively close edge intensity values may be considered as having a small difference in colors, and pixel points with relatively disparate edge intensity values may be considered as having a large difference in colors. Therefore, the edge intensity value may reflect content information of the image to some extent.

In step 102, a preset rectangular box is slid on the image to perform a search and, for the rectangular box at each searched position, a distribution value of information amount in the rectangular box is calculated according to the edge intensity values of the pixel points therein.

In exemplary embodiments, the preset rectangular box may be a rectangular box of any size that is smaller than that of the image. In one exemplary embodiment, a short side of the rectangular box is equal to a short side of the image, and a long side of the rectangular box is smaller than a long side of the image. In another embodiment, the short side of the rectangular box is smaller than the short side of the image, and the long side of the rectangular box is equal to the long side of the image. In yet another embodiment, the short side of the rectangular box is smaller than the short side of the image, and the long side of the rectangular box is smaller than the long side of the image, and so on. The embodiments are not limited thereto.

The search can be performed by sliding the rectangular box on the image in any direction. For example, the search may be performed by the rectangular box sliding in a horizontal direction, or in a vertical direction, or in a direction with a 45° angle, and so on.

In step 103, the rectangular box with the largest distribution value of information amount is selected, and content of the image corresponding to the selected rectangular box is intercepted to obtain a thumbnail of the image.

In the illustrated embodiment, a size of the generated thumbnail is not restricted. For example, the generated thumbnail may be an image of a 1600×1200 size. The intercepted image may also be compressed first, and the compressed image taken as the thumbnail. The embodiments are not limited thereto.

In one exemplary embodiment, for the rectangular box at each searched position, calculating the distribution value of information amount in the rectangular box according to the edge intensity values of the pixel points therein may include: for the rectangular box at each searched position, summarizing the edge intensity values of all of the pixel points in the rectangular box to obtain the distribution value of information amount in the rectangular box.

In one exemplary embodiment, sliding the preset rectangular box on the image to perform the search, and for the rectangular box at each searched position, calculating the distribution value of information amount in the rectangular box may include: calculating a spatial position attention value of each pixel point in the image by using an attention model pre-generated according to coordinates of a center point of the image and of each pixel point; sliding the preset rectangular box on the image to perform the search, and for the rectangular box at each searched position, calculating a distribution value of information amount of each pixel point in the rectangular box by using a distribution model of information amount pre-generated according to the edge intensity values and the spatial position attention values, and summarizing the distribution values of information amount of all of the pixel points in the rectangular box to obtain the distribution value of information amount in the rectangular box.

In one exemplary embodiment, summarizing the distribution values of information amount of all of the pixel points in the rectangular box to obtain the distribution value of information amount in the rectangular box may include: calculating a weight value corresponding to each pixel point in the image by using a pre-selected kernel function; multiplying the distribution value of information amount of each pixel point in the rectangular box by the corresponding weight value and then summarizing the weighted distribution values of information amount, to obtain the distribution value of information amount in the rectangular box; wherein the closer the pixel is to the center point of the image, the larger the weight value will be calculated by the kernel function.

In one exemplary embodiment, calculating the spatial position attention value of each pixel point in the image by using the attention model pre-generated according to coordinates of the center point of the image and of each pixel point may include: calculating the spatial position attention value of each pixel point in the image by using the following attention model:

$$P(i, j) = \exp\left(\frac{-(i - X_c)^2 - (j - Y_c)^2}{2 * \sigma^2}\right), \quad \text{equation (1)}$$

wherein (i, j) represents a pixel point in the image; P(i, j) represents the spatial position attention value of the pixel point; (Xc, Yc) represents the center point of the image; and a represents a preset coefficient.

In one exemplary embodiment, calculating the distribution value of information amount of each pixel point in the rectangular box by using the distribution model of information amount pre-generated according to the edge intensity values and spatial position attention values may include: calculating the distribution value of information amount of each pixel point in the rectangular box by using the following distribution model of information amount:

$$I(i,j) = E(i,j) * P(i,j) \quad \text{equation (2),}$$

wherein (i, j) represents a pixel point in the image; I(i, j) represents the distribution value of information amount of the pixel point; E(i, j) represents the edge intensity value of the pixel point; and P(i, j) represents the spatial position attention value of the pixel point.

In one exemplary embodiment, the rectangular box is a square with a side having the same length with the short side of the image, thereby the thumbnail after interception containing as much content information as possible.

In exemplary embodiments, to improve calculation efficiency, the image may be compressed before being filtered, to obtain an image with a smaller resolution, and then the successive steps, such as the filtering, may be performed. After the rectangular box with the largest distribution value of information amount is selected, the rectangular box is mapped to a corresponding position of the original image to intercept the image. Accordingly, filtering the image to obtain the edge intensity value for each pixel point in the image may include: compressing the original image, and filtering the compressed image to obtain the edge intensity value for each pixel point in the image.

Correspondingly, intercepting the content of the image corresponding to the selected rectangular box to obtain the thumbnail of the image includes: relating the selected rectangular box to a rectangular box in the original image, and intercepting the content in the rectangular box in the original image to obtain the thumbnail of the original image.

For example, a 1600×1200 image can firstly be compressed to a 400×400 image, and a rectangular box is selected on the 400×400 image. After the selection, the area corresponding to the rectangular box is mapped to a corresponding area on the 1600×1200 image. Then, intercepting and compressing may be performed to obtain the thumbnail. This method will improve the processing speed, and time may be saved, so as to satisfy the requirement of real time.

The method 100 generates the thumbnail of the image based on the content information of the image, thereby improving accuracy of expressing the content information of the original image, so as to be more consistent with human cognitive convention.

Figure 2:
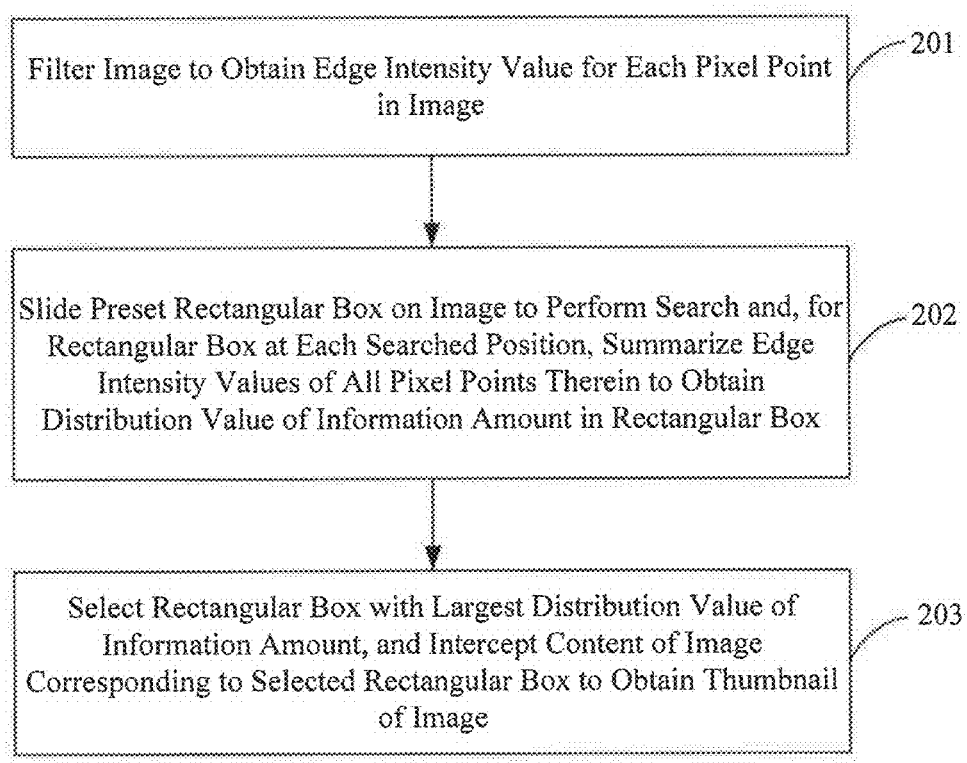
FIG. 2 is a flowchart of a method for generating a thumbnail of an image, according to an exemplary embodiment.

FIG. 2 is a method 200 for generating a thumbnail of an image, according to an exemplary embodiment. Referring to FIG. 2, the method 200 includes the following steps.

In step 201, the image is filtered to obtain an edge intensity value for each pixel point in the image. For example, filtering the image may be realized by using various filter operators, similar to the above description in connection with FIG. 1.

In step 202, a preset rectangular box is slid on the image to perform a search and, for the rectangular box at each searched position, the edge intensity values of all the pixel points therein are summarized to obtain a distribution value of information amount in the rectangular box.

In exemplary embodiments, a size of the rectangular box may be set as desired, as long as it is smaller than a size of the image. The rectangular box can be slid in any direction on the image to perform the search, similar to the above description in connection with FIG. 1.

For example, for the rectangular box at each searched position, the calculation may be performed by using the following equation:

$$I = \Sigma E(i,j) \quad \text{equation (3),}$$

wherein (i, j) represents a pixel point in the image; E(i, j) represents the edge intensity value of the pixel point; and I represents the distribution value of information amount in the rectangular box.

Here, the distribution value of information amount of each pixel point in the rectangular box may be considered as being equal to the edge intensity value of the point. Therefore, summarizing the edge intensity values of all of the pixel points in the rectangular box is summarizing the distribution values of information amount of all of the pixel points in the rectangular box, so that the distribution value of information amount in the rectangular box may be obtained.

In step 203, the rectangular box with the largest distribution value of information amount is selected, and content of the image corresponding to the selected rectangular box is intercepted to obtain a thumbnail of the image.

In the method 200, the thumbnail is generated based on the content information of the image, since the thumbnail is generated based on the edge intensity values. Accordingly, the thumbnail may contain important and significant content in the image, thereby improving accuracy of expressing the content information of the image by the thumbnail, so as to be more consistent with human cognitive convention.

Figure 3A:
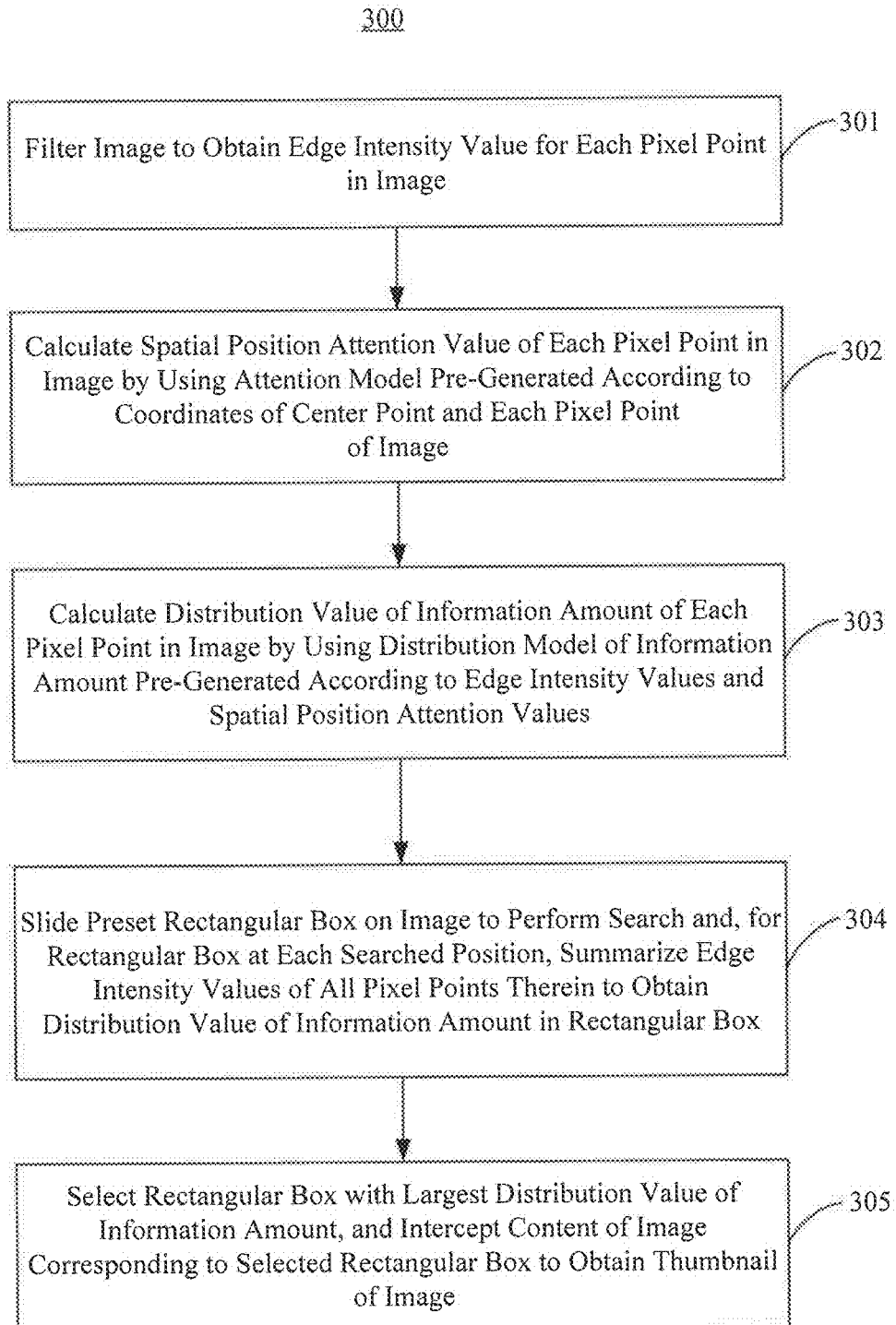
FIG. 3A is a flowchart of a method for generating a thumbnail of an image, according to an exemplary embodiment.

FIG. 3A is a flowchart of a method 300 for generating a thumbnail of an image, according to an exemplary embodiment. Referring to FIG. 3, the method 300 includes the following steps.

In step 301, the image is filtered to obtain an edge intensity value for each pixel point in the image. For example, filtering the image may be realized by using various filter operators, similar to the above description in connection with FIG. 1.

In addition, in order to facilitate calculation, the edge intensity values may be normalized into values in a range of 0~255 for further calculation.

In step 302, a spatial position attention value of each pixel point in the image is calculated by using an attention model pre-generated according to coordinates of a center point of the image and each pixel point of the image. For example, step 302 may include calculating the spatial position attention value of each pixel point in the image by using the attention model according to equation (1), reproduced below:

$$P(i, j) = \exp\left(\frac{-(i - X_c)^2 - (j - Y_c)^2}{2 * \sigma^2}\right), \quad \text{equation (1)}$$

wherein (i, j) represents a pixel point in the image; P(i, j) represents the spatial position attention value of the pixel point; (Xc, Yc) represents the center point of the image; and a represents a preset coefficient.

In exemplary embodiments, a value of the coefficient σ may be preset as desired. For example, the value may be preset to be ¼ of the minimal value of the length and the width of the image, etc., and there is no limitation in the embodiments.

In step 303, a distribution value of information amount of each pixel point in the image is calculated by using a distribution model of information amount pre-generated according to the edge intensity values and the spatial position attention values. For example, step 303 may include calculating the distribution value of information amount of each pixel point in the image by using the distribution model of information amount according to equation (2), reproduced below:

$$I(i,j) = E(i,j) * P(i,j) \quad \text{equation (2)}$$

wherein (i, j) represents a pixel point in the image; I(i, j) represents the distribution value of information amount of the pixel point; E(i, j) represents the edge intensity value of the pixel point; and P(i, j) represents the spatial position attention value of the pixel point.

In step 304, a preset rectangular box is slid on the image to perform a search and, for the rectangular box at each searched position, the distribution values of information amount of all of the pixel points in the rectangular box is summarized to obtain a distribution value of information amount in the rectangular box.

In exemplary embodiments, a size of the rectangular box may be set as desired, as long as the size of the rectangular box is smaller than a size of the image. In an embodiment, the rectangular box may be a square with a side having the same length with a short side of the image, thereby the thumbnail after interception contains as much content information as possible. There is no limitation in the embodiments.

The rectangular box is slid in any direction on the image to perform the search, and there is no limitation in the embodiments, similar to the above description in connection with FIG. 1.

In step 305, the rectangular box with the largest distribution value of information amount is selected, and content of the image corresponding to the selected rectangular box is intercepted to obtain a thumbnail of the image.

Figure 3B:
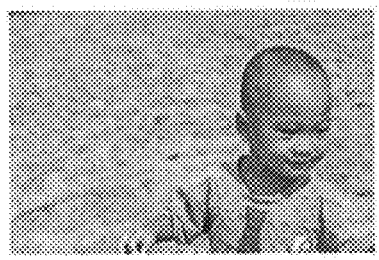
FIG. 3B is a schematic view illustrating a process of generating a thumbnail of an image, according to an exemplary embodiment.
Figure 3B:
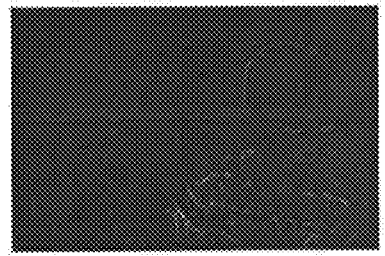
Figure 3B:
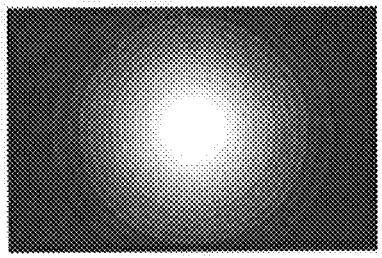
Figure 3B:
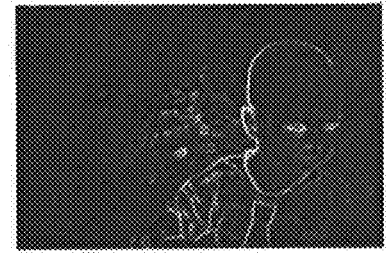

FIG. 3B is a schematic view showing a process 320 of generating a thumbnail of an image, according to an exemplary embodiment. Referring to FIG. 3B, image (1) shows an original image, and image (2) shows a result of filtering the original image (1) by using a Laplace edge filtering operator, wherein edge intensity values of all of the pixel points in the image (2) are normalized into values in a range of 0~255. Image (3) is a result of calculating a spatial position attention value of each pixel point in the image (2) by using an attention model pre-generated, wherein a lighter part on the image (3) indicates more attention a user will pay, i.e., the area that the user is interested in, and a darker part on the image (3) indicates less attention the user will pay. Image (4) is a result of calculating a distribution value of information amount of each pixel point in the image (3) by using a distribution model of information amount pre-generated, wherein all of the distribution values of information amount are normalized into values in a range of 0~255. It can be seen from the result that, by combining the edge intensity values with the spatial position attention values, pixel points with a higher distribution value of information amount will emerge in the image. Therefore, by selecting the rectangular box with the largest distribution value of information amount, a more accurate thumbnail may be generated. Compared with selecting only the central part of the image, the generated thumbnail may reflect the content information of the original image more accurately.

In the method 300, the thumbnail of the image is generated based on the edge intensity values and the spatial position attention values, so that the thumbnail may not only contain important and significant content in the image, but also concern positions of the content information of the image, thereby improving accuracy of expressing the content information of the original image by the thumbnail, so as to be more consistent with human cognitive convention. In addition, the method 300 may be performed in real time to generate the thumbnail more efficiently. In one exemplary embodiment, for a 1600×1200 image, a thumbnail may be generated in approximately 40~50 ms, and for a 100×100 image, a thumbnail may be generated in approximately about 10 ms, which satisfies the requirement of real time for, e.g., mobile devices.

Figure 4A:
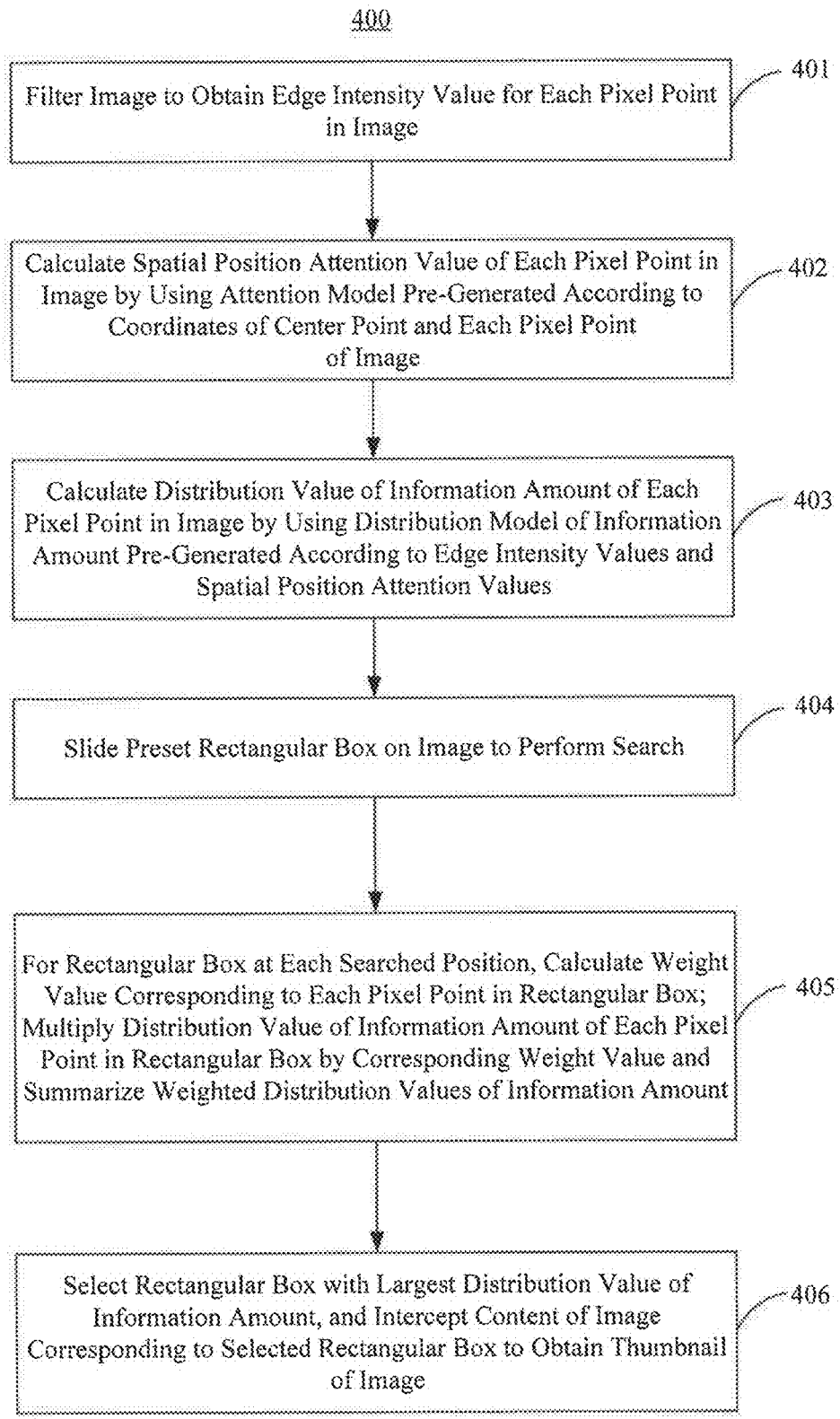
FIG. 4A is a flowchart of a method for generating a thumbnail of an image, according to an exemplary embodiment.

FIG. 4A is a flowchart of a method 400 for generating a thumbnail of an image, according to an exemplary embodiment. Referring to FIG. 4A, the method 400 includes the following steps.

In step 401, the image is filtered to obtain an edge intensity value for each pixel point in the image. For example, filtering the image may be realized by using various filter operators, similar to the above description in FIG. 1.

In step 402, a spatial position attention value of each pixel point in the image is calculated by using an attention model pre-generated according to coordinates of a center point and each pixel point of the image, similar to the above description in FIG. 3A.

In step 403, a distribution value of information amount of each pixel point in the image is calculated by using a distribution model of information amount pre-generated according to the edge intensity values and the spatial position attention values, similar to the above description in FIG. 3A.

In step 404, the image is searched by sliding a preset rectangular box on the image.

In exemplary embodiments, a size of the rectangular box may be set as desired, as long as the size of the rectangular box is smaller than a size of the image. In an embodiment, the rectangular box may be a square with a side having the same length with a short side of the image, thereby the thumbnail after interception contains as much content information as possible. The embodiments are not limited thereto.

The rectangular box can be slid in any direction on the image to perform the search, similar to the above description in FIG. 1.

In step 405, for the rectangular box at each searched position, a weight value corresponding to each pixel point in the rectangular box is calculated by using a pre-selected kernel function; the distribution value of information amount of each pixel point in the rectangular box is multiplied by a corresponding weight value and the weighted distribution values of information amount is summarized, to obtain the distribution value of information amount in the rectangular box.

For example, the closer the pixel is to the center point of the image, the larger the weight value will be calculated by the kernel function. Conversely, the further the pixel is apart from the center point of the image, the smaller the weight value will be calculated by the kernel function.

In exemplary embodiments, the kernel function may be realized through various manners, such as in the form of a function that is convex in the middle part and lower at both ends. The kernel function may be set such that the maximum weight is twice or three times of the minimum weight, and the minimum weight does not equal to 0, etc. Of course, other manners may also be adopted. For example, the kernel function may be a sine function, or a function with first and second lines, the first line rising up and the second line falling down, and the embodiments are not limited thereto.

Figure 4B:
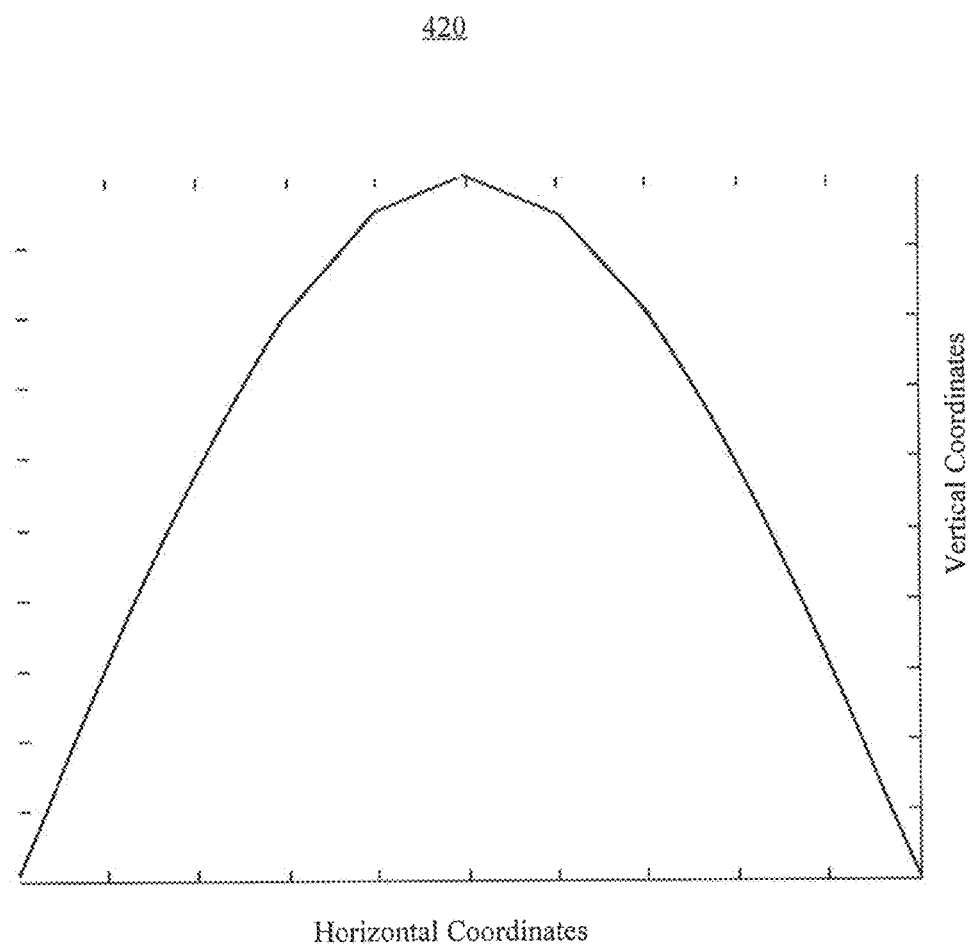
FIG. 4B is a schematic view illustrating a kernel function, according to an exemplary embodiment.

FIG. 4B is a schematic view showing a kernel function 420, according to an exemplary embodiment. In the illustrated embodiment, the rectangular box is a square with a length of each side equal to a length of a short side of the original image. It is further assumed that a horizontal side of the original image is a long side, and a vertical side of the original image is a short side. During the searching, the rectangular box will be slid in the horizontal direction, not in the vertical direction. Horizontal coordinates of the kernel function in FIG. 4B represent the horizontal coordinate of each pixel point in the image, and vertical coordinates of the kernel function represent the weight value corresponding to each pixel point. As can be seen from FIG. 4B, relatively large weight values are taken for the pixel points near the center of the image by the kernel function, and relatively small weight values are taken for the pixel points on the two sides of the image, according to which the distribution value of information amount in the rectangular box is calculated for interception, thereby placing the significant area with most information amount of the image in the center of the thumbnail.

Referring back to FIG. 4A, in step 406, the rectangular box with the largest distribution value of information amount is selected, and content of the image corresponding to the selected rectangular box is intercepted to obtain a thumbnail of the image.

In the method 400, the thumbnail of the image is generated based on the edge intensity values and the spatial position attention values, so that the thumbnail may not only contain important and significant content in the image, but also concern positions of the content information of the image, thereby improving accuracy of expressing the content information of the original image, so as to be more consistent with human cognitive convention. Further, in calculating the distribution value of information amount in the rectangular box, it is calculated in combination with the corresponding weight of each pixel point calculated through the kernel function. Since the closer the pixel is to the center point of the image, the larger the weight value will be taken by the kernel function, the calculated distribution value of information amount in the rectangular box is more consistent with the characteristic that the user will pay more attention to the center of the image, and the significant area with most information amount of the image may be placed in the center of the thumbnail, thereby the thumbnail reflects the significant part of the image, so as to satisfy the demands of the user. In addition, the method 400 may be performed in real time, and may generate the thumbnail more efficiently, so as to satisfy the requirement of real time for, e.g., mobile devices.

Figure 5A:
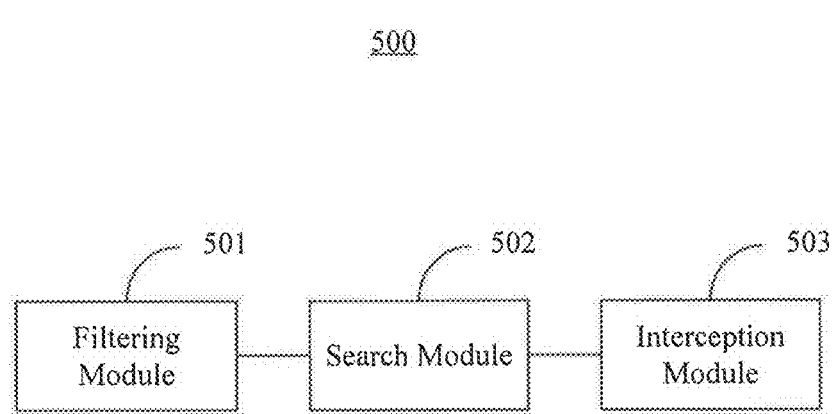
FIG. 5A is a block diagram of an apparatus for generating a thumbnail of an image, according to an exemplary embodiment.

FIG. 5A is a block diagram of an apparatus 500 for generating a thumbnail of an image, according to an exemplary embodiment. Referring to FIG. 5, the apparatus 500 includes a filtering module 501 configured to filter an image to obtain an edge intensity value for each pixel point in the image, and a search module 502 configured to slide a preset rectangular box on the image to perform a search, and calculate a distribution value of information amount in the rectangular box according to the edge intensity values of the pixel points therein for the rectangular box at each searched position. The apparatus 500 also includes an interception module 503 configured to select the rectangular box with the largest distribution value of information amount, and intercept content of the image corresponding to the selected rectangular box to obtain a thumbnail of the image.

In one exemplary embodiment, the search module 502 includes a search unit configured to slide the preset rectangular box on the image to perform the search, and a calculation unit configured to, for the rectangular box at each searched position, summarize the edge intensity values of all of the pixel points therein to obtain the distribution value of information amount in the rectangular box.

Figure 5B:
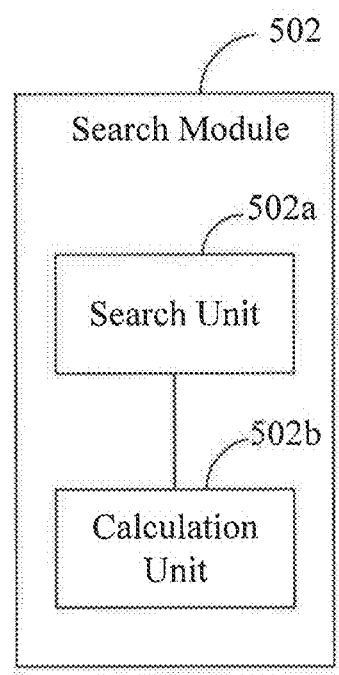
FIG. 5B is a block diagram of an apparatus for generating a thumbnail of an image, according to an exemplary embodiment.

FIG. 5B is a block diagram of the search module 502 (FIG. 5A), according to another embodiment. Referring to FIG. 5B, the search module 502 includes a search unit 502a and a calculation unit 502b.

The search unit 502a is configured to slide the preset rectangular box on the image to perform the search.

The calculation unit 502b is configured to calculate a spatial position attention value of each pixel point in the image by using an attention model pre-generated according to coordinates of a center point and each pixel point of the image; to calculate a distribution value of information amount of each pixel point in the image by using a distribution model of information amount pre-generated according to the edge intensity values and the spatial position attention values; and to summarize the distribution values of information amount of all of the pixel points in the rectangular box to obtain the distribution value of information amount in the rectangular box, for the rectangular box at each position searched by the search unit 502a.

In one exemplary embodiment, the calculation unit 502b includes a calculation subunit for distribution value of information amount, configured to calculate a weight value corresponding to each pixel point in the rectangular box by using a pre-generated kernel function; and to multiply the distribution value of information amount of each pixel point in the rectangular box by the corresponding weight value and then summarize the weighted distribution values of information amount, to obtain the distribution value of information amount in the rectangular box; wherein the closer the pixel is to the center point of the image, the larger the weight value will be calculated by the kernel function.

In one exemplary embodiment, the calculation unit 502b may include a calculation subunit for spatial position attention value, configured to calculate the spatial position attention value of each pixel point in the image by using the attention model according to equation (1), reproduced below:

$$P(i, j) = \exp\left(\frac{-(i-X_c)^2 - (j-Y_c)^2}{2*\sigma^2}\right), \quad \text{equation (1)}$$

wherein (i, j) represents a pixel point in the image; P(i, j) represents the spatial position attention value of the pixel point; (Xc, Yc) represents the center point of the image; and σ represents a preset coefficient.

In one exemplary embodiment, the calculation unit 502b includes a calculation subunit for distribution value of information amount, configured to calculate the distribution value of information amount of each pixel point in the image by using the distribution model of information amount according to equation (2), reproduced below:

$$I(i,j)=E(i,j)*P(i,j) \quad \text{equation (2),}$$

wherein (i, j) represents a pixel point in the image; I(i, j) represents the distribution value of information amount of the pixel point; E(i, j) represents the edge intensity value of the pixel point; and P(i, j) represents the spatial position attention value of the pixel point.

In one exemplary embodiment, the rectangular box is a square, and a length of a side thereof is equal to a short side of the image.

Referring back to FIG. 5A, in one exemplary embodiment, the apparatus 500 may further include a compression module (not shown) configured to compress an original image. The filtering module 501 is configured to filter the compressed image to obtain the edge intensity value for each pixel point in the image, and the interception module 503 is configured to relate the selected rectangular box to a rectangular box in the original image, and intercept the content of the image in the rectangular box in the original image to obtain the thumbnail of the original image.

The apparatus 500 may be applied in a terminal including, but not limited to: a mobile phone, a tablet computer, etc. The apparatus 500 may perform any of the above described methods for generating a thumbnail of an image.

By using the apparatus 500, the thumbnail may be generated based on the content information of the image, thereby improving accuracy of expressing the content information of the original image by the thumbnail, so as to be more consistent with human cognitive convention.

Figure 6:
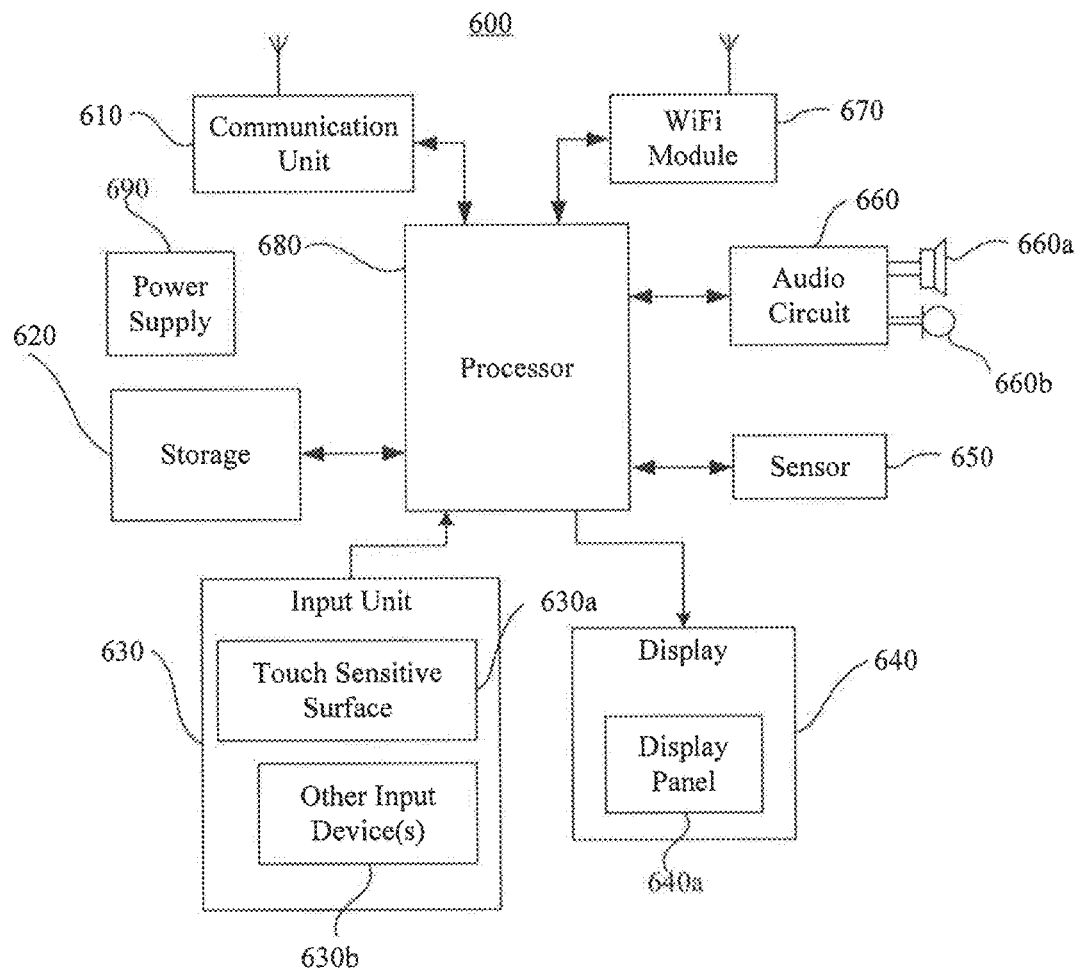
FIG. 6 is a block diagram of a terminal, according to an exemplary embodiment.

FIG. 6 is a block diagram of a terminal 600, according to an exemplary embodiment. Referring to FIG. 6, the terminal 600 includes one or more of a communication unit 610, a storage 620, an input unit 630, a display 640, a sensor 650, an audio circuit 660, a wireless fidelity (WiFi) module 670, a processor 680 including one or more processing cores, and a power supply 690, etc. Those skilled in the art will understand that the structure shown in FIG. 6 does not constitute a limitation to the terminal 600, and the terminal 600 may include more or less components than those shown in FIG. 6, or combine some of the components, or have different component arrangements.

The communication unit 610 is configured to transmit and receive information, or to transmit and receive signal during a procedure of calling. The communication unit 610 may be a network communication device such as a radio frequency (RF) circuit, a router and a modem, etc. For example, when the communication unit 610 is the RF circuit, the communication unit 610 receives downlink information from a base station, and then transmits the downlink information to the processor 680 to be processed. Also, the communication unit 610 transmits uplink data to the base station. Generally, the RF circuit as the communication unit 610 includes, but is not limited to, an antenna, at least one amplifier, a tuner, one or more oscillators, a subscriber identity module (SIM) card, a transceiver, a coupler, a low noise amplifier (LNA), a duplexer, etc. Furthermore, the communication unit 610 may communicate with a network and other devices through wireless communication. The wireless communication may use any communication standards or protocols including but not being limited to global system of mobile communication (GSM), general packet radio service (GPRS), code division multiple access (CDMA), wideband code division multiple access (WCDMA), long term evolution (LTE), email, short messaging service (SMS) and the like.

The storage 620 is configured to store software programs and modules. The processor 680 performs various functional applications and data processing by running the software programs and modules stored in the storage 620. The storage 620 may include a program storage area and a data storage area. The program storage area may store an operating system and application programs required by at least one function (such as a function of sound playback and a function of image playback, etc.), and the data storage area may store data created during operation of the terminal 600 (such as audio data and phone book, etc.). In addition, the storage 620 may include a high-speed random access memory and may also include a non-volatile memory. For example, the storage 620 may include at least one disk storage device, a flash memory device or other non-volatile solid-state memory devices. Accordingly, the storage 620 may also include a storage controller to provide access to the storage 620 performed by the processor 680 and the input unit 630.

The input unit 630 is configured to receive input numbers or characters, and generate input signals from a keyboard, a mouse, a joystick, an optical device, or a trackball related to user setting and functional control. The input unit 630 may include a touch sensitive surface 630*a* and one or more other input device(s) 630*b*. The touch sensitive surface 630*a*, also known as a touch screen or a track pad, may collect user's touch operations on or near the touch sensitive surface 630*a* (such as an operation performed by users using any suitable object or accessory such as a finger, a touch pen and the like on or near the touch sensitive surface 630*a*), and drive a corresponding connected device according to a preset program. The touch sensitive surface 630*a* may include first and second parts, i.e., a touch detection device and a touch controller. The touch detection device detects a touching operation of the user, detects a signal caused by the touch operation, and transmits the signal to the touch controller. The touch controller receives touch information from the touch detection device, transforms it into coordinates of the touch point, and sends the coordinates to the processor 680. The touch controller may also receive a command from the processor 680 and execute the command. In addition, the touch sensitive surface 630*a* may be realized in various types, such as a resistive type, a capacitive type, an infrared type and a surface acoustic wave type, etc. In addition to the touch sensitive surface 630*a*, the input unit 630 may also include one or more other input devices 630*b*. The other input devices 630*b* may include but not limited to one or more of a physical keyboard, functional keys (such as volume control keys, switch buttons, etc.), a trackball, a mouse, a joystick, etc.

The display 640 is configured to display information input by the user or information provided for the user and various graphical user interfaces of the terminal 600. These graphical user interfaces may consist of graphics, texts, icons, videos and any combination thereof. The display 640 may include a display panel 640*a*, and the display panel 640*a* may be configured with a liquid crystal display (LCD) or an organic light-emitting diode (OLED), etc. Further, the touch sensitive surface 630*a* may cover the display panel 640*a*. When a touch operation on or near the touch sensitive surface 630*a* is detected by the touch sensitive surface 630*a*, the touch operation is sent to the processor 680 to determine a type of the touch operation, and a corresponding visual output will be provided on the display panel 640*a* by the processor 680 according to the type of touch operation. Although in FIG. 6 the touch sensitive surface 630*a* and the display panel 640*a* are two separate components to realize input and output functions, in some embodiments, the touch sensitive surface 630*a* and the display panel 640*a* may be integrated to realize input and output functions.

The sensor 650 may be a light sensor, a motion sensor, or any other sensors. The light sensor may include an ambient light sensor and a proximity sensor. The ambient light sensor may adjust a brightness of the display panel 640*a* according to a brightness of the ambient light. The proximity sensor may turn off the display panel 640*a* and/or backlight when the terminal 600 moves close to the user's ear. As an example of the motion sensor, a gravity acceleration sensor may detect the acceleration in each direction (e.g., along three axes), and may detect the magnitude and the direction of gravity when it is stationary, which may be used in applications for recognizing the terminal attitude (such as horizontal and vertical screen switching, related games, pose calibration of a magnetometer), functions related to vibration recognizing (such as a pedometer or clicking), etc. The terminal 600 may also be equipped with other sensors such as a gyroscope, a barometer, a hygrometer, a thermometer and an infrared sensor, etc.

The audio circuit 660 is coupled to a speaker 660*a* and a microphone 660*b*, and may provide an audio interface between the user and the terminal 600. The audio circuit 660 may transform received audio data into electrical signals which are transmitted to the speaker 660*a* and transformed into sound signals to be output by the speaker 660*a*. On the other hand, the microphone 660*b* transforms collected sound signals into electrical signals which are received and transformed into audio data by the audio circuit 660. After being output to the processor 680 to be processed, the audio data is transmitted to, for example, another terminal via the RF circuit as the communication unit 610, or output to the storage 620 for further processing. The audio circuit 660 may also include an ear bud jack to allow a communication between an external earphone and the terminal 600.

The WiFi module 670 provides the user with a wireless broadband Internet access, which allows the user to send and receive emails, browse webpages and access streaming media, etc. Although FIG. 6 shows the WiFi module 670, those skilled in the art will understand that the WiFi module 670 is not a necessary component of the terminal 600, and may be omitted as desired.

The processor 680 is a control center of the terminal 600 that connects various parts of the terminal 600 through various interfaces and circuits, performs various functions and data processing of the terminal 600 by running or executing the software programs and/or modules stored in the storage 620 and by invoking data stored in the storage 620. The processor 680 may include one or more processing cores. In an embodiment, the processor 680 may be integrated with an application processor that processes operating systems, user interfaces and application programs, and a modem processor that processes the wireless communication. In some embodiments, the modem processor may not be integrated into the processor 680.

The power supply 690 is configured to supply power to components of the terminal 600. In an embodiment, the power supply 690 may be logically connected to the processor 680 through a power supply management system, so as to achieve the functions such as charge, discharge and power consumption managements, etc., through the power supply management system. The power supply 690 may also include one or more components of a direct current (DC) or alternating current (AC) power supply, a recharge system, a power failure detection circuit, a power converter or an inverter and a power status indicator, etc.

Although not shown, the terminal 600 may also include a camera and a Bluetooth module, etc.

In exemplary embodiments, there is also provided a non-transitory readable storage medium including instructions, such as included in the storage 620, executable by the processor 680 in the terminal 600, for performing the above-described methods for generating a thumbnail of an image.

One of ordinary skill in the art will understand that the above described modules/units can each be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for generating a thumbnail of an image, comprising:

filtering an image to obtain an edge intensity value for each pixel point in the image;

calculating a spatial position attention value of each pixel point in the image by using an attention model pre-generated according to coordinates of a center point and each pixel point of the image, as follows:

$$P(i, j) = \exp\left(\frac{-(i - X_c)^2 - (j - Y_c)^2}{2 * \sigma^2}\right),$$

wherein (i, j) represents a pixel point in the image; P(i, j) represents the spatial position attention value of the pixel point; (Xc, Yc) represents the center point of the image; and σ represents a preset coefficient;

calculating a distribution value of information amount of each pixel point in the image by using a distribution model of information amount pre-generated according to the edge intensity values and the spatial position attention values, as follows:

$$I(i,j)=E(i,j)*P(i,j),$$

wherein I(i, j) represents the distribution value of information amount of the pixel point; and E(i, j) represents the edge intensity value of the pixel point;

sliding a preset rectangular box on the image to perform a search and, at each searched position, calculating a weight value corresponding to each pixel point in the rectangular box by using a pre-selected kernel function;

multiplying the distribution value of information amount of each pixel point in the rectangular box by the corresponding weight value to obtain the weighted distribution value of information amount of each pixel point; and summarizing the weighted distribution values of information amount of all of the pixel points in the rectangular box to obtain the distribution value of information amount in the rectangular box;

selecting the rectangular box with the largest distribution value of information amount; and intercepting content of the image corresponding to the selected rectangular box to obtain a thumbnail of the image.

2. The method according to claim 1, wherein the closer a pixel point is to the center point of the image, the larger the weight value is calculated for that pixel point by the kernel function.

3. The method according to claim 1, wherein the rectangular box is preset to be a square with a side having a same length as a short side of the image.

4. The method according to claim 1, wherein:

the filtering of the image comprises: compressing an original image, and filtering the compressed image to obtain the edge intensity value for each pixel point in the image; and the intercepting of the content of the image corresponding to the selected rectangular box to obtain the thumbnail of the image comprises: relating the selected rectangular box to a rectangular box in the original image, and intercepting content in the rectangular box in the original image to obtain the thumbnail of the original image.

5. A terminal, comprising:
a processor; and
a storage for storing instructions executable by the processor;
wherein the processor is configured to:
filter an image to obtain an edge intensity value for each pixel point in the image;
calculate a spatial position attention value of each pixel point in the image by using an attention model pre-generated according to coordinates of a center point and each pixel point of the image, as follows:

$$P(i, j) = \exp\left(\frac{-(i - X_c)^2 - (j - Y_c)^2}{2*\sigma^2}\right),$$

wherein (i, j) represents a pixel point in the image; P(i, j) represents the spatial position attention value of the pixel point; (Xc, Yc) represents the center point of the image; and σ represents a preset coefficient;
calculate a distribution value of information amount of each pixel point in the image by using a distribution model of information amount pre-generated according to the edge intensity values and the spatial position attention values, as follows:

$I(i,j)=E(i,j)*P(i,j),$ wherein I(i, j) represents the distribution value of information amount of the pixel point; and E(i, j) represents the edge intensity value of the pixel point;
slide a preset rectangular box on the image to perform a search and, for the rectangular box at each searched position,
calculate a weight value corresponding to each pixel point in the rectangular box by using a pre-selected kernel function;
multiply the distribution value of information amount of each pixel point in the rectangular box by the corresponding weight value to obtain the weighted distribution value of information amount of each pixel point; and
summarize the weighted distribution values of information amount of all of the pixel points in the rectangular box to obtain the distribution value of information amount in the rectangular box;
select the rectangular box with the largest distribution value of information amount; and
intercept content of the image corresponding to the selected rectangular box to obtain a thumbnail of the image.

6. The terminal according to claim 5, wherein the closer a pixel point is to the center point of the image, the larger the weight value is calculated for that pixel point by the kernel function.

7. The terminal according to claim 5, wherein the processor is further configured to slide on the image, as the preset rectangular box, a square with a side having a same length as a short side of the image.

8. The terminal according to claim 5, wherein the processor is further configured to:
compress an original image, and filter the compressed image to obtain the edge intensity value for each pixel point in the image; and
relate the selected rectangular box to a rectangular box in the original image, and intercept the content in the rectangular box in the original image to obtain the thumbnail of the original image.

9. A non-transitory storage medium having stored therein instructions that, when executed by a processor of a terminal, cause the terminal to perform a method for generating a thumbnail of an image, the method comprising:
filtering an image to obtain an edge intensity value for each pixel point in the image;
calculating a spatial position attention value of each pixel point in the image by using an attention model pre-generated according to coordinates of a center point and each pixel point of the image, as follows:

$$P(i, j) = \exp\left(\frac{-(i - X_c)^2 - (j - Y_c)^2}{2*\sigma^2}\right),$$

wherein (i, j) represents a pixel point in the image; P(i, j) represents the spatial position attention value of the pixel point; (Xc, Yc) represents the center point of the image; and σ represents a preset coefficient;
calculating a distribution value of information amount of each pixel point in the image by using a distribution model of information amount pre-generated according to the edge intensity values and the spatial position attention values, as follows:

$I(i,j)=E(i,j)*P(i,j),$ wherein I(i, j) represents the distribution value of information amount of the pixel point; and E(i, j) represents the edge intensity value of the pixel point;
sliding a preset rectangular box on the image to perform a search and, for the rectangular box at each searched position,
calculating a weight value corresponding to each pixel point in the rectangular box by using a pre-selected kernel function;
multiplying the distribution value of information amount of each pixel point in the rectangular box by the corresponding weight value to obtain the weighted distribution value of information amount of each pixel point; and
summarizing the weighted distribution values of information amount of all of the pixel points in the rectangular box to obtain the distribution value of information amount in the rectangular box;
selecting the rectangular box with the largest distribution value of information amount; and
intercepting content of the image corresponding to the selected rectangular box to obtain a thumbnail of the image.

* * * * *